Jan. 15, 1924.  
E. G. BUSSE  
1,480,742  
MOUNT FOR THIRD OR FOURTH POINT SUPPORTS FOR BRAKE BEAMS  
Filed Aug. 12, 1921
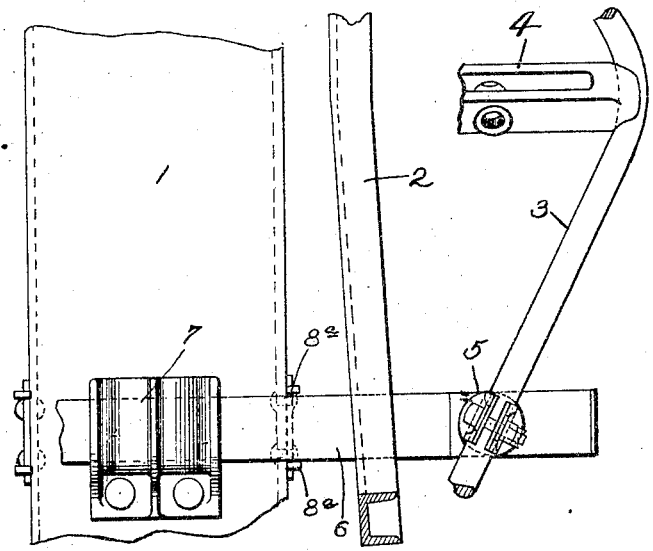
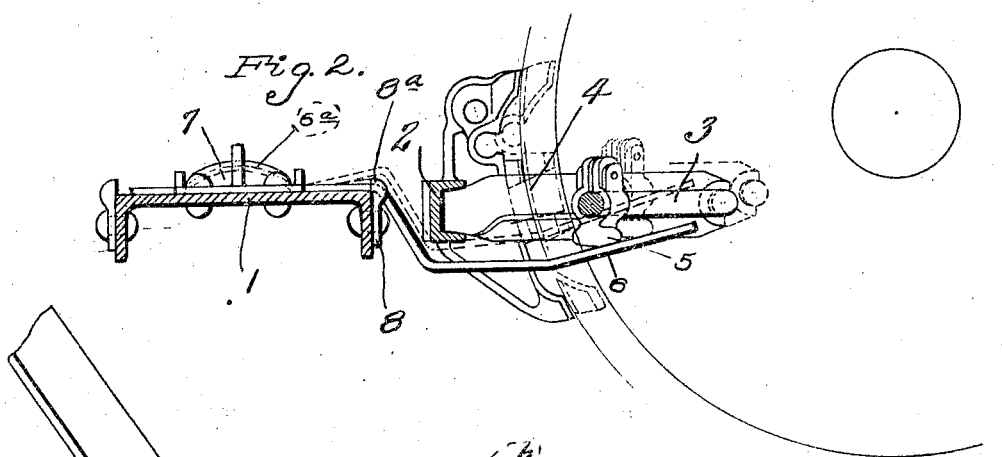
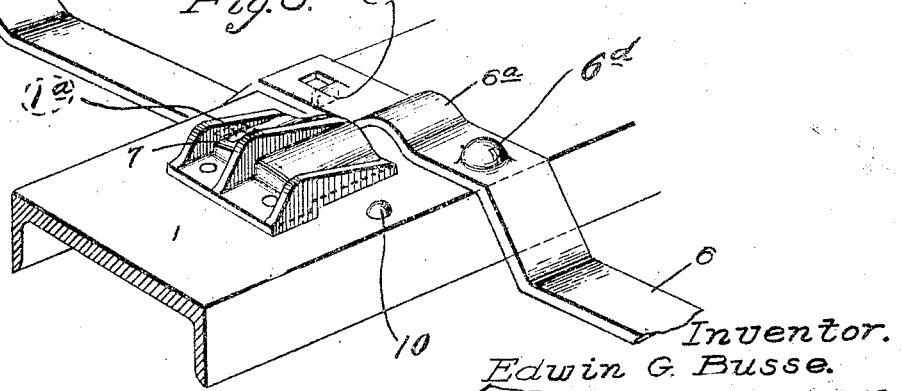
Inventor.  
Edwin G. Busse.  
By F. R. Cornwall, Atty.

Patented Jan. 15, 1924.

1,480,742

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

MOUNT FOR THIRD OR FOURTH POINT SUPPORTS FOR BRAKE BEAMS.

Application filed August 12, 1921. Serial No. 491,800.

*To all whom it may concern:*

Be it known that I, EDWIN G. BUSSE, a citizen of the United States, residing at Chicago, Illinois, have invented a certain new and useful Improvement in Mounts for Third or Fourth Point Supports for Brake Beams, of which the following is a full, clear, and exact description, such as will enable others skilled in the art to which it appertains to make and use the same, reference being had to the accompanying drawings, forming part of this application, in which—

Figure 1 is a plan view of a part of a car truck and brake beam showing my improved mount and support in position.

Figure 2 is a side elevational view of the same.

Figure 3 is a detailed view of a modified form.

This invention relates to a new and useful improvement in mounts for third or fourth point supports for brake beams and is designed particularly as an improvement upon devices of this character such as are shown in United States Patents Nos. 1,182,455, granted to me May 9, 1916, Williams Patent No. 1,199,955, granted October 3, 1916, 1,249,321, granted to me December 11, 1917, and the Williams Patent No. 1,249,578, also granted December 11, 1917, the object being to utilize the resiliency in the third or fourth point support to hold it in position. This contemplates preferably some permanently arranged means on a part of the car truck with which the support cooperates and is held against longitudinal and vertical movement, there being other permanently arranged means in the path of lateral movement of the support which necessitates a yielding support being sprung thereover, the resiliency inherent in this support finally forcing the support to assume a position in which it is interlocked with the part of the car truck on which it is mounted.

In the drawings, 1 indicates a spring plank, preferably of channel-shape, which is here shown inverted, but it is obvious that my invention may be equally adapted for use in connection with a spring plank whose flanges were presented upwardly.

2 indicates the compression member of a brake beam, 3 its tension member, and 4 the strut. 5 is the chair or clip constituting the fourth point support which cooperates with the bent-up end of an inclined resilent track member 6. This track member is shown provided with a jog or bend 6$^a$ at its center which is adapted to cooperate with a bracket 7 riveted or otherwise secured to the spring plank 1. This bracket 7 has a recess, open at one side, which is designed to receive the jog or bend 6$^a$ of the support when the same is moved or hammered laterally in position.

8 indicates a bracket, riveted or secured to the side edges of the spring plank, and having two lugs 8$^a$ spaced apart sufficiently to receive the support between them.

In operation, the bent portion 6$^a$ of the support is first inserted in its seat in the bracket, which seat overhangs sufficiently for this purpose, after which the support is moved laterally up against the lugs 8$^a$. The ends of the support are now bent upwardly as shown by dotted lines in Figure 2, after which the support is driven home in its seat or until it occupies a position between the lugs 8$^a$, at which time the ends of the support will be permitted to move downwardly by virtue of the resiliency of the support itself and said support will now lie between the lugs 8$^a$ and be held against lateral displacement.

The weight of the beam serves to assist in holding the supporting track between the lugs 8$^a$ and prevent its accidental displacement.

In Figure 3 I have shown a modification of my invention in which, at the left, the spring plank is cut away as at 1$^a$ and the support is provided with a downwardly bent tongue 6$^b$ designed to register with the opening 1$^a$ and hold the support against lateral displacement. At the right, in Figure 3, I have shown a rivet head 10 forming a protuberance on the spring plank which is designed to fit in a recess formed by bulging the support as at 6$^d$.

What I claim is:

1. A mount for flexible third or fourth point supports comprising means adapted to be attached to a part of a truck and receive said support while the latter is stressed whereby said support is held against movement by its own resiliency.

2. A mount for flexible third or fourth point supports comprising means adapted to be attached to a part of a truck and receive said support and maintain it under tension whereby said support is held against movement in all directions by its own resiliency.

3. The combination of a part of a car truck retaining means secured thereto, and a yielding third or fourth point support adapted to be engaged by said means, said support being, by its own resiliency, adapted to be held in interlocking engagement with said part of the car truck.

4. The combination of a part of a car truck, a flexible third or fourth point support, and a projection immovably fixed on one of said parts and in the path of movement of the other, said support being sprung over said fixed projection in being moved to and from its operative position.

5. The combination of a part of a car truck, a bracket thereon, a flexible third or fourth point support having a projection formed in its truck engaging portion, said projection being adapted to interlockingly engage said bracket, whereby said support is held against longitudinal movement in said bracket, and a fixed projection on said part of the car truck and in the path of movement of said support to and from its operative position for holding said support against lateral movement when in its home position.

6. The combination of a part of a car truck, a resilient third or fourth point support detachably mounted thereon, and means cooperating with said support whereby it is stressed into locked position.

7. The combination of a part of a car truck, substantially immovable and undetachable members thereon, and a third or fourth point support cooperating with said members and adapted to be stressed to become disengaged therefrom.

8. A mount or bracket having an immovable seat adapted to interengage with a third or fourth point support for holding the latter against longitudinal and vertical movement, said seat being permanently open at one side.

9. A mount or bracket having an immovable seat adapted to interengage with a third or fourth point support, said seat being permanently open at one side, in combination with immovable means arranged at one side of said seat for holding the support therein.

10. The combination of a part of a car truck, a third or fourth point support having a projection, a bracket for engaging said projection to hold said support against longitudinal and vertical movement, and immovably fixed means arranged at one side of said bracket for holding said support against lateral movement.

In testimony whereof I hereunto affix my signature this 4th day of Aug., 1921.

EDWIN G. BUSSE.